March 16, 1971 W. J. GARTNER 3,570,199
FIREPROOF PARTITIONS
Filed Oct. 25, 1968 2 Sheets-Sheet 1
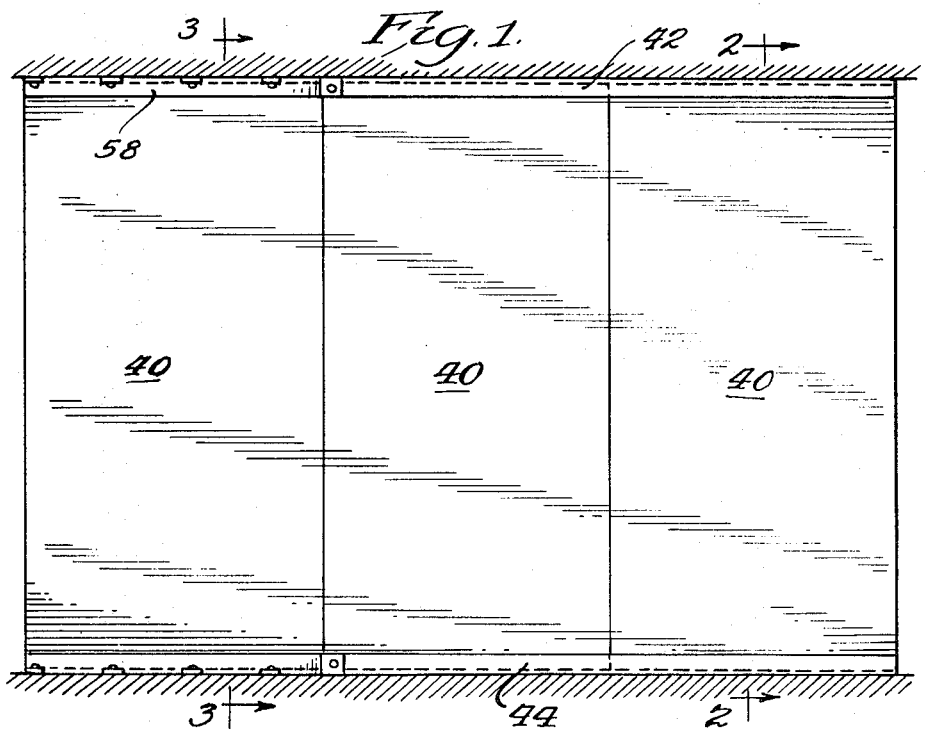
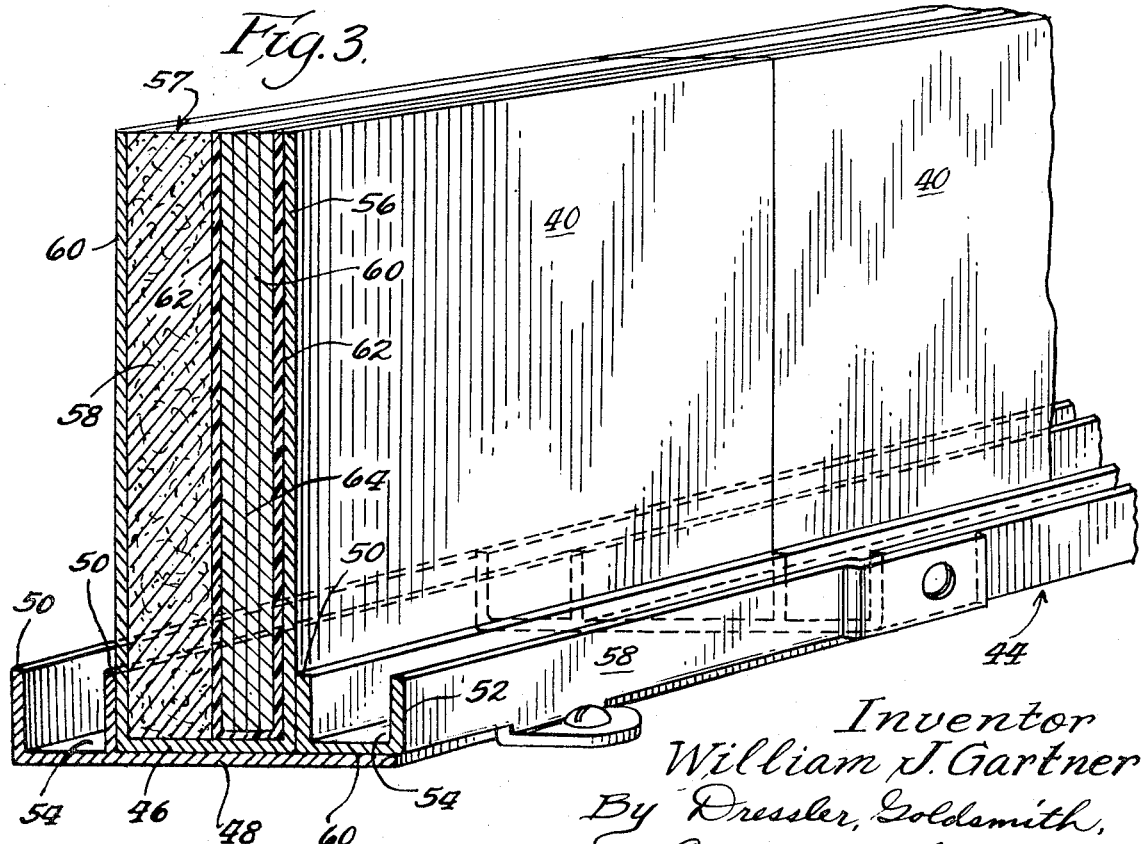
Inventor
William J. Gartner
By Dressler, Goldsmith,
Clement and Gordon
Attys.

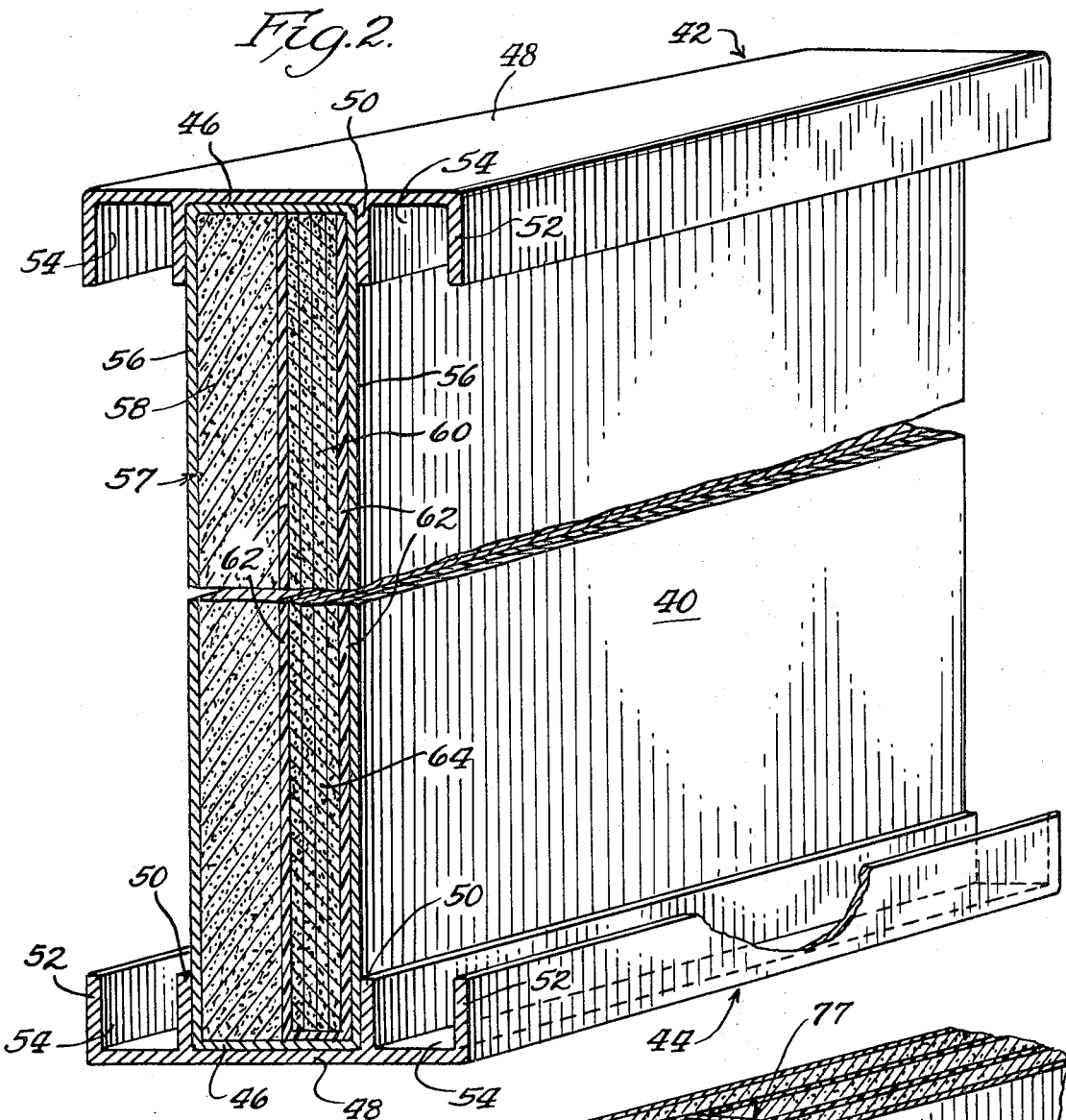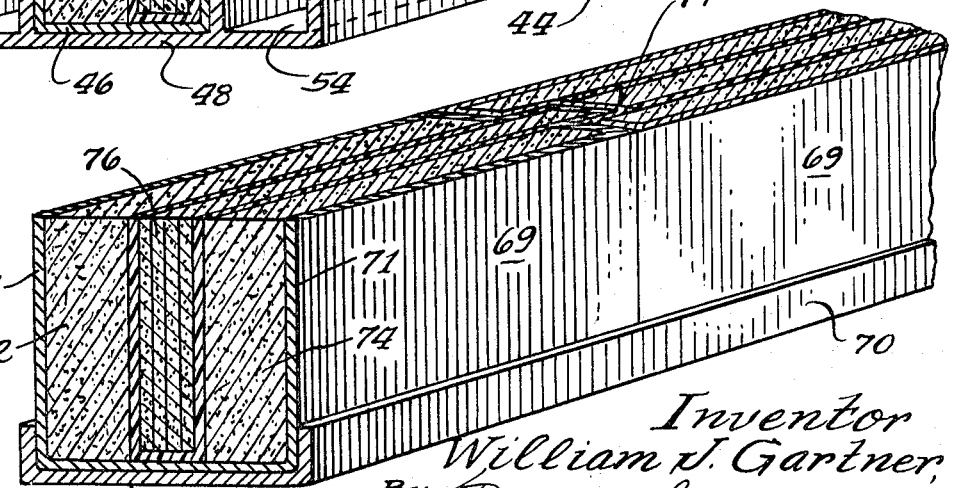

United States Patent Office 3,570,199
Patented Mar. 16, 1971

3,570,199
FIREPROOF PARTITIONS
William J. Gartner, Schaumburg, Ill., assignor to De Soto, Inc.
Continuation-in-part of application Ser. No. 702,307, Feb. 1, 1968. This application Oct. 25, 1968, Ser. No. 770,768
Int. Cl. E04b *1/76, 2/04*
U.S. Cl. 52—168                                      14 Claims

ABSTRACT OF THE DISCLOSURE

A partition for providing thermal insulation to a region on at least one side thereof from sources of intense heat. The partition comprises a wall member which contains within rigid outer walls a sheet-like insulating member of at least two layers. One of the layers, which faces the source of heat, comprises fibrous material having high temperature resistance, while the other layer comprises a porous carrier, preferably having heat insulating properties, containing liquid water interspersed throughout the pores of the carrier. The carrier is enclosed in a water impermeable casing which ruptures upon exposure to elevated temperatures. Typically, a plurality of wall members of the above construction abut each other to form a heat resistant wall.

CROSS REFERENCE TO RELATED APPLICATION

This application is a continuation-in-part of U.S. application S.N. 702,307, filed on Feb. 1, 1968, filed by William J. Gartner, Edward A. Gauger, and Wallace H. Brown and now abandoned.

BACKGROUND OF THE INVENTION

This invention relates to thermally insulating walls and partitions which are effective against intense, long lasting heat on one side thereof.

It is frequently necessary to provide fireproof, heat resistant walls to rooms and compartments in buildings, ships, and the like, particularly where inflammable materials are used. A substantial advantage is gained if these walls are lightweight, if they retain high heat resistant properties comparable to the conventional, heavy, fireproof walls.

It is also desirable for one to be able to dismantle and re-erect the heat-resistant walls as requirements change. Such lightweight, temporary walls which have high thermal resistance have clear advantages over a concrete wall or one made of gypsum plaster. These latter walls are heavy, and are erected and dismantled with a great deal of expense and effort. Also, they are not reusable in a new location after dismantling.

DESCRIPTION OF THE INVENTION

In accordance with this invention, a partition is provided for providing thermal insulation from sources of intense heat. The partition typically comprises a plurality of insulating wall members abutting each other, and means for holding the wall members in said abutting relation. Each wall member comprises a sheet-like insulating member of at least two layers, within rigid outer walls. One of said layers comprises a fibrous material having high temperature resistance which faces the expected source of heat. The other layer comprises at least one porous carrier containing liquid water interspersed throughout the pores of said carrier, the carrier being enclosed in a water impermeable casing, which casing ruptures upon exposure to elevated temperatures, typically of about 100° to 120° C. Generally, the best results are achieved when from about 10 to 50 percent of the volume (or thickness) of the insulating member constitutes the layer comprising the porous carrier and the water-impermeable casing.

The layer of fibrous material shields the layer containing the wet, porous carrier from extremes of heat, and reduces the rate of heat flow through the wall member. The wet, porous carrier absorbs that heat which does pass through the fibrous material layer by boiling of the water present, resulting in a partition having very high and long lasting insulating characteristics. Preferably, the porous carrier is a thermally insulating material, so that it continues to inhibit the flow of heat even after all the water has evaporated.

The wall members of this invention are relatively light in weight, but have high insulating capacity. They can be constructed to be reusable in different locations from time to time as needs change.

DESCRIPTION OF THE DRAWINGS

FIG. 1 is an elevational view of heat resistant wall members of this invention, abutted together in side by side relation to form a partition wall.

FIG. 2 is a sectional view, shown in perspective, taken along line 2—2 of FIG. 1.

FIG. 3 is a partial sectional view, shown in perspective, taken along line 3—3 of FIG. 1.

FIG. 4 is a partial sectional view, shown in perspective, of another embodiment of a partition of this invention.

DESCRIPTION OF SPECIFIC EMBODIMENT

Referring to FIGS. 1 through 3, heat resistant wall members 40 are shown mounted in side by side, abutting relationship in upper bracket 42 and lower bracket 44. Typically, wall members 40 are about 4 feet wide and 8 feet long. Brackets 44 and 42 are mounted respectively on the floor and ceiling of a room in a building, or the like. The wall members 40 slide in a channel 46 of each bracket 42 and 44, which are generally of similar construction. Members 40 are held together in side by side relationship to form a heat resistant partition or wall.

Each bracket 42 and 44 contains a back plate 48, inner upstanding members 50 which define channel 46, and outer upstanding members 52 to define outer channels 54.

Each wall member 40 has outer sheet metal walls 56 which enclose a heat protective liner 57 having portions 58 and 60. Typically, portion 58 is about ⅝ inch thick and portion 60 about ⅜ inch thick. Portion 58 of the protective liner 57 is made of a fibrous material having high temperature resistance.

Typically, this fibrous material having high temperature resistance is potassium titanate or ceramic fiber (e.g.) ceramic fiber padding sold under the trade name of Johns-Manville Cerafelt. However, other fibrous materials having similar high temperature resistance can be used if desired. The fibrous material used should have a temperature resistance enabling it to withstand, without any physical change or degradation, temperatures of at least 1700° F. and preferably temperatures of at least 2000° F. for an indefinite period of time (at least two days). It is also desirable for the fibrous material to have a low thermal conductivity.

One particularly suitable example of a material suitable for use as portion 58 is a rigid and boardlike material sold under the name of Hi-R-Bord, made of ceramic fiber, asbestos, mineral wool, and potassium titanate, all bonded together with a colloidal silica binder. This material can stand very high temperatures without structural degradation.

Portion 60 of the heat protective liner comprises a water-impermeable, rupturable casing 62 containing a water soaked porous carrier 64, such as several sheets of fibrous glass paper.

Typically, casing 62 can be twenty-five pound kraft paper laminated to aluminum foil on its outer surface and coated with a layer of polyethylene. Alternatively, it can be polyethylene-coated cellophane, which is in turn laminated to a plastic film which is highly resistant to the passage of water vapor, such as a copolymer of vinyl chloride and vinylidene chloride. Plastic films alone are also usable.

Any porous carrier which can absorb and hold water can be used herein, although it is preferred for the porous carrier to have a very low thermal conductivity and high stability in temperatures of up to at least 1000° F. It is particularly desirable for the material used to have a thermal conductivity factor of less than 0.65 B.t.u. inches per square foot per degree Fahrenheit per hour when measured at 1000° F. Many forms of fibrous glass paper and cloth, asbestos paper and cloth, and combinations thereof, fulfill this requirement, and are readily used as the porous carrier. Other materials which can be used as a porous carrier in less preferred embodiments are plastic foams such as epoxy, phenolic, or silicone resin foams or fibrous organic materials such as cardboard, cotton or felt. In the embodiment shown, each porous carrier consists of a number of sheets of paper made out of a mixture of glass fiber and crysotile asbestos bonded together with an organic binder.

The porous carrier contains liquid water interspersed throughout its pores, and it can also contain a humectant such as calcium chloride, ammonium chloride, calcium nitrate, glycerine, or silica gel in order to inhibit the loss of water from the porous carrier by means of evaporation.

A typical water-humectant solution for use in this invention might contain 16 weight percent of calcium chloride, based on the weight of the water present. This solution has a tendency to absorb water from the atmosphere, and thus the likelihood of the water solution evaporating away from the porous carriers is essentially eliminated.

A gelling agent such as methylcellulose, hydroxyethylcellulose, or vinylic polymers containing sufficient carboxylic acid groups to render the polymer water-soluble can be added to prevent the water from settling to the bottom of the porous carrier with a resulting scarcity of water at the top. A gelling agent also stiffens the composite of porous carriers and casing, permitting it to stand up more securely within the container walls. A type of the latter vinylic polymer is available under the trademark Carbopol from the B. F. Goodrich Co. This latter material can be used, for example, by dipping a porous carrier such as fibrous glass paper into a 1 weight percent aqueous solution of the vinylic polymer to saturate the paper with the solution. The paper is then dipped in or sprayed with an aqueous solution of ammonia to immediately cause gellation of the vinylic polymer within the pores of the glass fiber paper, entrapping the water contained therein.

Another suitable gelling agent is a hydrolyzed acrylonitrile polymer.

Portion 58 of heat protective liner 57 faces the expected source of heat so that only such heat as passes through portion 58 can reach portion 60. That heat which does pass through portion 58 is absorbed by boiling of the water within casing 62, thus preventing the heat from passing through wall section 40 to any large degree. When the porous carrier has low heat transmissivity, as in the preferred embodiment of this invention, protection against the passage of heat through the liner continues even after all of the water has been evaporated off.

As an optional feature in FIGS. 2 and 3, outer channels 54 of brackets 42 and 44 are provided to permit the installation of decorative wall board, or panelling, if desired.

In the embodiment shown, the wall members 40 are installed as follows: First, the brackets 42 and 44 are affixed on the floor and ceiling in the location desired. Removable section 58 of each of the brackets 42 and 44 is formed by a portion of upstanding walls 50 and 52 and bottom piece 60 to cooperatively form a U-shaped channel. Section 58 is affixed to the remainder of each bracket 42 and 44 by bolts or the like, and can be removed to permit the installation of wall members 40, or the disassembly of a wall into its component sections. Each wall member 40 is easily mounted in channels 46 of brackets 42 and 44 while removable section 58 is not in place, and each wall section can then be slid as needed along channel 46 to occupy its desired position. After the last wall section 40 is emplaced, removable section 58 is bolted in place on each of brackets 42 and 44, to firmly secure the wall sections in the brackets.

Preferably, each wall section is fabricated to provide different, but mating, contours on each side thereof so as to provide, for example, a close fitting tongue and groove joint between adjacent wall sections (not shown in FIG. 3).

FIG. 4 shows another embodiment of two adjacent wall sections 69 of this application, resting in a simple U-shaped bracket 70, which is attached to a floor or ceiling for mounting the wall section. The sections are in juxtaposition at tongue and groove joint 77.

In this embodiment, sheet metal walls 71 of the wall section enclose a heat protective liner having three portions. The outer two portions 72 and 74 are similar in nature to portion 58 of FIG. 1, containing a fibrous material having high temperature resistance such as potassium titanate or ceramic fiber.

The middle portion 76 of the heat protective liner is similar in makeup to portion 60 of FIGS. 2 and 3, being a fibrous material such as fibrous glass paper soaked in water and enclosed in a rupturable, water impermeable casing.

This embodiment of the wall panel of the present application exhibits great resistance to the transfer of heat across the wall members in either direction, since the water-containing portion 76 is protected on both sides from direct exposure to heat.

If desired, the insulating sections described above can be used as flooring or ceiling material as well as for constructing walls. They also find other uses, e.g. as permanent or temporary bulkheads in ships or aircraft.

From the foregoing, it will be observed that numerous variations and modifications may be effected without departing from the true spirit and scope of the novel concept of the invention. It is, of course, intended to cover by the appended claims all such modifications as fall within the scope of the invention.

What is claimed is:

1. A substantially flat, separate partition for providing thermal insulation to a region on at least one side thereof from sources of intense heat which comprises: an insulating wall member, said wall member comprising a sheet-like insulating member, enclosed within rigid, outer walls, said insulating member comprising at least two layers, one said layer comprising fibrous material having high temperature resistance, and the other said layer comprising at least one porous carrier containing liquid water interspersed throughout the pores of said carrier, said liquid water containing a gelling agent for preventing the liquid water from settling to the bottom of said carrier, said carrier being enclosed in a water-impermeable casing, which casing ruptures upon exposure to elevated temperatures, said layer of fibrous material being located between said layer comprising the porous carrier and an outer wall.

2. A partition as set forth in claim 1 including a plurality of insulating wall members abutting each other in generally coplanar relation, and means for holding said wall members in said abutting relation.

3. The partition of claim 2 in which said rigid outer walls are made of sheet metal.

4. The partition of claim 2 in which said wall members are rectilinear in shape, and in which said means for holding said insulating wall members in abutting relation comprises channel members, spaced in parallel relation at a distance apart to permit opposite edges of each said insulating wall member to fit within said channel members.

5. The partition of claim 2 in which said fibrous material having high temperature resistance comprises a rigid composite of potassium titanate, ceramic fiber, asbestos, minearal wool, and a silica binder.

6. The partition of claim 2 in which said porous carrier comprises fibrous glass.

7. The partition of claim 6 in which said porous carrier is enclosed in a water-impermeable casing which comprises a material selected from the group consisting of polyethylene, poly(vinyl chloride-vinylidene chloride), and combinations thereof.

8. A partition of modular construction for providing thermal insulation to a region on at least one side thereof from sources of intense heat, which comprises: a plurality of insulating wall members abutting each other in generally coplanar relation, and means for holding said wall members in said abutting relation, each said wall member comprising a sheetlike insulating member, enclosed within rigid, outer walls, said insulating member comprising at least two layers, a first layer comprising fibrous material having high temperature resistance, and a second said layer comprising at least one porous carrier of high thermal insulating properties comprised of fibrous glass and containing liquid water interspersed throughout the pores of said carrier, said carrier being enclosed in a water-impermeable casing which comprises a material selected from the group consisting of polyethylene, poly(vinyl chloride-vinylidene chloride), and combinations thereof, which casing ruptures upon exposure to elevated temperatures, from 10 to 50 percent of the volume of each said insulating member comprising said second layer, said first layer of fibrous material being located between said second layer comprising the porous carrier and an outer wall, said casing carrying aluminum foil on its outer surface.

9. An insulating wall member for partitioning a space and for providing thermal insulation to a region on one side thereof from sources of intense heat which comprises: a sheetlike insulating member enclosed within rigid, outer walls, said insulating member comprising at least two layers, a first layer comprising fibrous material having high temperature resistance, and a second layer comprising at least one porous carrier comprised of fibrous glass and containing liquid water interspersed throughout the pores of said carrier, said carrier being enclosed in a water-impermeable casing which comprises a material selected from the group consisting of polyethylene, poly(vinyl chloride-vinylidene chloride), and combinations thereof, which casing ruptures upon exposure to elevated temperatures, from 10 to 50 percent of the volume of each said insulating member comprising said second layer, said first layer of fibrous material being located between said second layer comprising the porous carrier and the expected source of heat, said casing carrying aluminum foil on its outer surface.

10. A substantially flat, separate partition for providing thermal insulation to a region on at least one side thereof from sources of intense heat which comprises: an insulating wall member, said wall member comprising a sheetlike insulating member, enclosed within rigid, outer walls, said insulating member comprising at least two layers, one said layer comprising fibrous material having high temperature resistance, and the other said layer comprising at least one porous carrier containing a liquid water-humectant solution interspersed throughout the pores of said carrier, said carrier being enclosed in a water-impermeable vapor-permeable casing, which casing ruptures upon exposure to elevated temperatures, said layer of fibrous material being located between said layer comprising the porous carrier and an outer wall.

11. The wall member of claim 10 in which said sheetlike, insulating member is enclosed along its two major faces between a pair of sheet metal members.

12. The wall member of claim 10 in which said fibrous material having high temperature resistance comprises a rigid composite of potassium titanate, ceramic fiber, asbestos, mineral wool, and a silica binder.

13. The wall member of claim 10 in which said porous carrier comprises fibrous glass.

14. The wall member of claim 13 in which said porous carrier is enclosed in a water-impermeable casing which comprises a material selected from the group consisting of polyethylene, poly(vinyl chloride-vinylidene chloride), and combinations thereof.

References Cited
UNITED STATES PATENTS

| | | | |
|---|---|---|---|
| 1,350,363 | 8/1920 | Dick | 109—29 |
| 2,492,422 | 12/1949 | Govan | 109—80 |
| 2,520,972 | 9/1950 | Siple | 109—29 |
| 3,066,847 | 12/1962 | Fortune | 109—82 |
| 3,343,314 | 9/1967 | Smith | 52—615 |
| 3,382,821 | 5/1968 | Dundr | 109—82 |
| 3,495,417 | 2/1970 | Ratliff | 52—168 |

OTHER REFERENCES

Condensed Chemical Dictionary, Reinhold, VI edition, pages 1211 and 1212.

HENRY C. SUTHERLAND, Primary Examiner

U.S. Cl. X.R.

52—232, 238